United States Patent [19]

Lund

[11] 4,334,177
[45] Jun. 8, 1982

[54] DC MOTOR CONTROL CIRCUIT
[76] Inventor: Van M. Lund, 9250 Forest View Rd., Evanston, Ill. 60203
[21] Appl. No.: 180,836
[22] Filed: Aug. 25, 1980
[51] Int. Cl.³ .............................................. H02P 5/16
[52] U.S. Cl. ............................ 318/345 G; 318/338; 318/345 C; 318/356
[58] Field of Search ................... 318/139, 338, 345 C, 318/345 G, 356

[56] References Cited
U.S. PATENT DOCUMENTS

| | | | |
|---|---|---|---|
| 2,297,930 | 1/1967 | Payne | 318/269 |
| 3,325,714 | 6/1967 | Torll | 318/376 |
| 3,544,873 | 12/1970 | Gunsser et al. | 318/376 |
| 3,555,389 | 1/1971 | Opal | 318/345 G |

Primary Examiner—David Smith, Jr.
Attorney, Agent, or Firm—Van Metre Lund

[57] ABSTRACT

A circuit is disclosed in which the armature and the field winding of a DC motor are respectively connected in series with first and second silicon controlled rectifiers to which controlled pulses are applied to render the rectifiers alternately conducting with a toggling action. A capacitor is connected between terminals of the rectifiers to facilitate the toggling action and a free-wheeling diode is connected in parallel with the field winding to insure that field current is flowing at the same time that armature current is flowing.

4 Claims, 2 Drawing Figures

DC MOTOR CONTROL CIRCUIT

This invention relates to a control circuit for control of the energization of DC motors and more particularly to a control circuit with which silicon controlled rectifiers or the like may be used to obtain efficient and reliable control of the energization of a DC motor from batteries while permitting the speed of the motor to be continuously varied. The circuit is very simple, uses a minimum number of component parts and is otherwise economically manufacturable.

BACKGROUND OF THE PRIOR ART

When batteries or equivalent DC sources are used to supply power to one or more DC motors as in electric vehicles, for example, the control of energization of the motors poses serious problems. Silicon controlled rectifiers as used in prior circuits have a serious disadvantage because they have the characteristic that once they are turned on, i.e., once they are conductive, they cannot be turned off or made nonconductive through a signal applied to the gate or control electrode thereof. As a result, it has been necessary to combine such rectifiers with transformers, inductors and/or other expensive components when used in controlling energization of DC motors from sources other than AC sources. Transistors have problems with respect to power loss therewithin and when high currents must be handled, they become quite expensive. Mechanical controllers also have problems especially with regard to wear, arcing and breakdown.

SUMMARY OF THE INVENTION

In accordance with this invention, a circuit is provided which is quite simple and which permits use of silicon controlled rectifiers without requiring the addition of expensive components. This is accomplished by connecting the armature and field of a DC motor in series with silicon controlled rectifiers which are alternately conductive, each being triggered to cut-off conduction through the other. An important advantage of the circuit is that expensive components such as transformers, inductors and the like are not required.

Other advantages, features and objects of the invention will become more fully apparent from the following detailed description taken in conjunction with the accompanying drawings.

DESCRIPTION OF A PREFERRED EMBODIMENT

Figure 1:
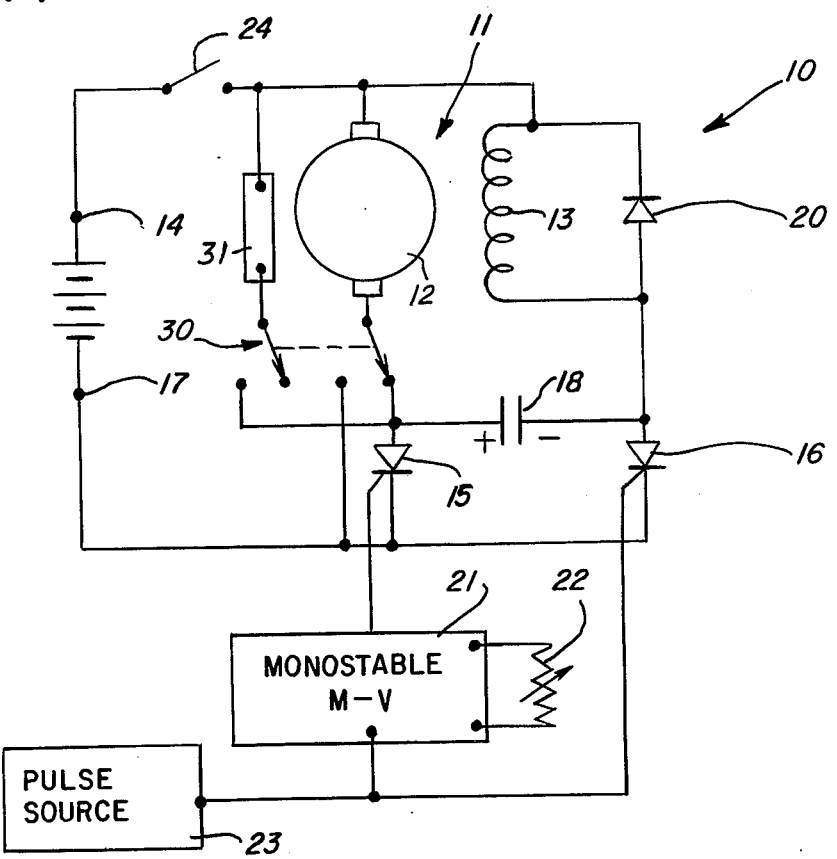
FIG. 1 illustrates a circuit constructed in accordance with the invention.

Reference numeral 10 generally designates a motor control circuit constructed in accordance with the principles of this invention. In the circuit 10, a motor 11 to be controlled is provided which includes an armature 12 and a field winding 13 and which may preferably by of a "shunt" type, the field winding having a relatively high resistance. As shown, terminals of the armature 12 and the field winding 13 are connected together and to one terminal 14 of a battery 15. The other terminals of the armature 12 and field winding 13 are connected to anodes of a pair of silicon controlled rectifiers 15 and 16 which have cathodes connected together and to the negative terminal 17 of the battery 15. A capacitor 18 is connected between the anodes of the rectifiers 15 and 16 and a free-wheeling diode 20 may be connected across the field winding 13.

The control electrode of the rectifier 15 is connected to the output of a monostable multivibrator 21 which is controllable by an adjustable resistor 22 connected thereto. The multivibrator 21 is supplied with pulses from a pulse source 23 which is connected directly to the control electrode of the rectifier 16. An on-off switch 24 may preferably be connected between the positive terminal 14 of the battery 15 and the terminals of the armature 12 and field winding 13, also to the multivibrator 21 and pulse source 23 for supplying operating voltages thereof.

In operation, the switch 24 is closed and, initially, the resistor 22 may be so adjusted that the monostable multivibrator 21 produces no output pulses. With pulses applied only to the rectifier 16, the field winding 13 will be energized continuously. Then, the resistor 22 may be so adjusted that the monostable multivibrator 21 produces a pulse just ahead of each pulse from the pulse source 23. That is to say, the duration of the timing interval of the multivibrator 21 is set so that it is only slightly less than the time interval between pulses from the pulse source 23 which may be at a substantially uniform frequency.

When a pulse is developed by the monostable multivibrator 21, the rectifier 15 is triggered into conduction and, as a result, a high negative potential is applied to the anode of the rectifier 16, sufficient to cut off conduction therethrough, the capacitor 18 being charged with a polarity as indicated during conduction of the rectifier 16. Thus, the rectifier 15 will be conducting and the rectifier 16 will be cut off. A high value of current continues to flow through the field winding 13 and through the diode 20, however, so that current flowing through the armature and rectifier 15 during non-conduction of rectifier 16 will produce a high output torque.

During conduction of the rectifier 15, the capacitor 18 will be charged to a polarity opposite that shown and when the next pulse is applied from the pulse source 23, the rectifier 16 is again rendered conductive to cut off the rectifier 15.

Figure 2:
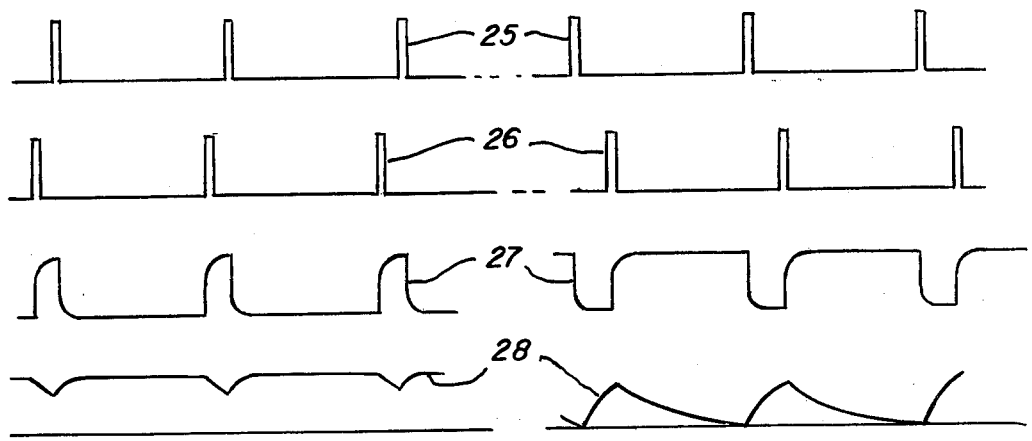
FIG. 2 illustrates waveforms for explanation of the operation of the circuit of FIG. 1.

The lower speed, high torque conditions of operation are indicated in the left-hand portion of FIG. 2, in which reference numeral 25 indicates the form of the pulses applied from the pulse source 23, reference numeral 26 indicates the waveform of the pulses developed by the monostable multivibrator 21, reference numeral 27 indicates the waveform of the current pulses applied to the armature 12 and reference numeral 28 indicates the waveform of the current flowing through the field winding 13. In the conditions as depicted in the left-hand portion of FIG. 2, the armature current is relatively low and the field current is high, so that the motor will operate at a low speed but with a high torque.

The right-hand portion of FIG. 2 illustrates the conditions for high speed operation. As shown, the output pulses of the multivibrator 21 are advanced in phase by adjusting the resistor 22 to obtain a shorter timing interval and, as a result, the percentage of time of conduction of armature current is increased while the percentage of time of conduction of field current is reduced. As a result, the motor is operated at a high speed but with reduced torque, of course.

Once a certain speed is reached, a double pole switch 30 may be operated to a position opposite that illustrated to connect one terminal of the armature 12 directly to the battery terminal 17 and to connect an impedance 31 between the anode of the rectifier 15 and the terminal 14 of the battery. The impedance 31 then serves the same function as previously performed by the armature 12 with respect to pulsing of the field current and obtaining control thereof. At the same time, with the direct connection of the armature 12 across the battery, the efficiency is increased and, in addition, the system may be so operated as to obtain regenerative braking. The impedance 31 may be a resistor and/or inductor having a relatively high resistance or impedance for minimizing power loss but still low enough to obtain the "toggling" action for control of field current. Switch 30 may be mechanically connected to the resistor 22 to be operated at a certain position thereof or it may be provided by contacts of a relay automatically operated at a certain position of the resistor 22.

The circuit is highly advantageous in that silicon devices or the like can be used which are highly efficient and reliable. It has the further advantage of simplicity, no separate inductors or transformers being required.

It will be understood that modifications and variations may be effected without departing from the spirit and scope of the novel concepts of this invention.

I claim:

1. A circuit for control of a DC motor which includes an armature and a field winding, said DC motor being operative during application of a current to said armature to develop an output torque proportional to current flowing in said field winding, comprising: first and second semiconductor devices respectively connected in series with said armature and said field winding for connection between terminals of a battery or other DC source, a first electrode of said first device being connected to a first terminal of said armature, a first electrode of said second device being connected to a first terminal of said field winding, one terminal of said DC source being connected to second electrodes of said first and second devices, and the other terminal of said DC source being connected to a second terminal of said armature and to a second terminal of said field winding, a capacitor connected between said first electrodes of said semiconductor devices, and means for applying pulses to said semiconductor devices to initiate conduction of each device and thereby cut off conduction through the other, and diode means connected between said first and second terminals of said field winding for maintaining current flow through said field winding during nonconduction of said second semiconductor device connected in series therewith.

2. In a circuit as defined in claim 1, said semiconductor devices being silicon controlled rectifiers on the equivalent having anode, cathode and control electrodes and having a characteristic such that the voltage developed between said anode and cathode electrode is limited to a very low value.

3. In a circuit as defined in claim 1, means for controlling the relative timing of said pulses to control the relative percentage of time of conduction of said devices.

4. In a circuit as defined in claim 1, means controllably operable for connecting an impedance separate from said armature in series with said first semiconductor device and said DC source and for simultaneously connecting said armature to said DC source.

* * * * *